United States Patent [19]
Hashimoto et al.

[11] Patent Number: 4,778,046
[45] Date of Patent: Oct. 18, 1988

[54] BELT CONVEYOR

[75] Inventors: Kunio Hashimoto; Haruo Okazaki, both of Kitakyushu, Japan

[73] Assignee: Bridgestone Corporation, Tokyo, Japan

[21] Appl. No.: 127,225

[22] Filed: Dec. 1, 1987

[30] Foreign Application Priority Data

Dec. 2, 1986 [JP] Japan ................ 61-285891

[51] Int. Cl.$^4$ ............................ B65G 15/08
[52] U.S. Cl. ............................ 198/819; 198/841
[58] Field of Search ............ 198/819, 833, 842, 841

[56] References Cited

U.S. PATENT DOCUMENTS

| | | |
|---|---|---|
| 3,338,383 | 8/1967 | Hashimoto et al. |
| 3,381,799 | 5/1961 | Havelka .......................... 198/833 X |
| 4,234,078 | 11/1980 | Nott ............................... 198/833 |
| 4,363,399 | 12/1982 | Ludwig et al. ................. 198/833 |
| 4,402,395 | 9/1983 | Hashimoto . |
| 4,625,860 | 12/1986 | Kawasaki et al. ............. 198/819 |
| 4,630,726 | 12/1986 | Hashimoto ..................... 198/819 |
| 4,653,961 | 3/1987 | Hashimoto . |
| 4,723,653 | 2/1988 | Engst ............................. 198/819 |

FOREIGN PATENT DOCUMENTS

| | | |
|---|---|---|
| 2061853 | 5/1981 | United Kingdom . |
| 2094741 | 9/1982 | United Kingdom . |
| 2115364 | 9/1983 | United Kingdom . |

Primary Examiner—Robert J. Spar
Assistant Examiner—D. Glenn Dayoan
Attorney, Agent, or Firm—Hayes, Davis & Soloway

[57] ABSTRACT

A transporting belt is partially held by a holding belt. The holding belt is rolled up into a tubular shape through which both of the forward and return paths of the transporting belt passes. Both of the belts are supported by a plurality of shape-maintaining frames each of which comprises a plurality of shape-maintaining rollers arranged like a circle. The holding belt is provided at a horizontal or vertical curved portion so that the transporting belt may travel smoothly and may not be exposed to the weather.

6 Claims, 2 Drawing Sheets

BELT CONVEYOR

BACKGROUND OF THE INVENTION

The present invention relates to a belt conveyor and particularly to a belt conveyor where a flat transporting belt is partially held by a holding belt to convey material.

A conventional belt conveyor transports granular or powdered material. However, it is disadvantegeous for conveyed material to be scatterred by the wind or is subject to rain water, particularly, when powdered material is transferred through the outdoors to another warehouse.

Also, in the conventional flat belt conveyor, it is very difficult or impossible to curve the traveling path, and if the bending is desired, it is necessary to connect a number of short flat belt conveyors each of which comprises drive means, such as motor, and drive rollers, which gives rise to high cost for foundation. Further, it is disadvantageous for material to be dropped out of the flat belt conveyor partially whenever the conveyed material is transferred from one flat belt to another.

SUMMARY OF THE INVENTION

It is therefore a primary object of the present invention to provide a belt conveyor which transports granular or powdered material at a horizontal or vertical curved portion without difficulty.

It is another object of the present invention to provide a belt conveyor which travels so that conveyed material may be neither dropped out of the belt nor exposed to the weather.

It is further object of the present invention to provide a belt conveyor which is simple in structure and is less expensive for manufacturing.

In the belt conveyor according to the present invention, an endless transporting belt conveys granular or powdered material loaded at one end to the other end where it is dropped to the destination. The transporting belt, usually flat, is held by the holding belt, which passes through a plurality of shape-maintaining rollers arranged like a circle in each shape-maintaining frame, so that the holding belt is rolled up into a tubular shape for traveling. Therefore, where the transporting belt is held by the holding belt, the conveyed material is insulated from the outside and is not exposed to the weather. Where the transporting belt is held by the holding belt, a plurality of shape-maintaining frames are arranged in a bending form horizontally or vertically; so the belt conveyor can be smoothly curved. The flat belt which gets away from the holding belt transports material as well as the conventional flat belt conveyor.

BRIEF DESCRIPTION OF THE DRAWINGS

These and other objects as well as advantages of the present invention will become clear by the following description of preferred embodiments of the present invention with reference to the accompanying drawings, wherein.

DETAILED DESCRIPTION OF PREFERRED EMBODIMENTS

Figure 1:
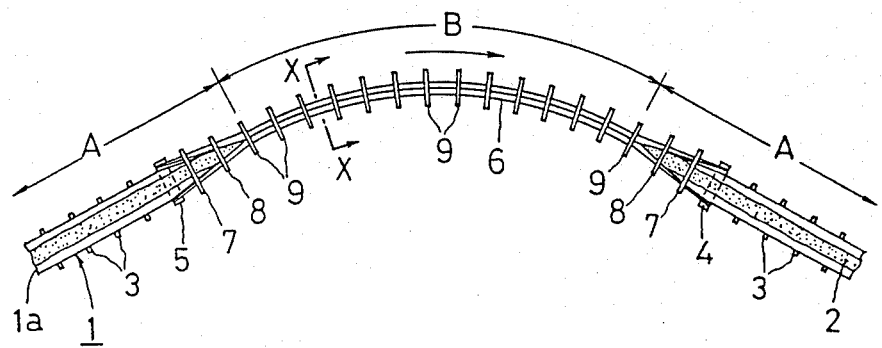
FIG. 1 is a plan view of a belt conveyor according to the present invention in which a transporting belt is contained in a holding belt.
Figure 2:
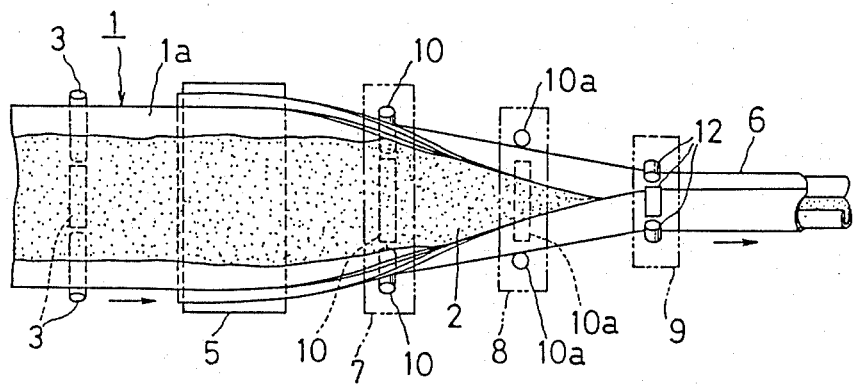
FIG. 2 is an enlarged plan view of the main part in FIG. 1.
Figure 3:
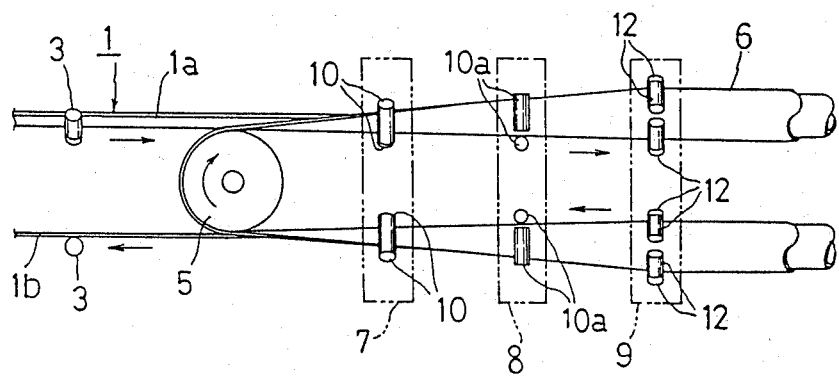
FIG. 3 is a side view of FIG. 2.

FIG. 1 shows a belt conveyor which turns to the right direction, in which the numerals 1, 2 and 3 represent a transporting belt, conveyed material and a support roller for the transporting belt 1 respectively.

An endless holding belt 6 wider than the flat transporting belt 1 is wound around a front roller 4 and a rear roller 5 provided at both ends of a curved portion B which is provided between a straight forward path 1a and a straight return path 1b. The holding belt 6 travels between the front and rear rollers 4 and 5 to include the transporting belt 1.

Between the front and rear rollers 4 and 5, first rolling-up frames 7 and second rolling-up frames 8 are provided, and a plurality of shape-maintaining frames 9 are provided between the second rolling-up frames 8 and 8.

Three rolling-up rollers 10 are provided to support the trough-like holding belt 6 within the upper part of the first rolling-up frame 7, while three rolling-up rollers 10a are arranged like a U-shape within the upper part of the second rolling-up frame 8. The lower parts of the rolling-up frames 7 and 8 comprise structure similar to the upper parts. At the upper and lower parts of each shape-maintaining frame 9, there is provided a circular opening 11 around which six shape-maintaining rollers 12 are arranged like a circle.

In the foregoing apparatus, when the transporting belt 1 runs, the holding belt 6 wich encloses the flat belt 1 runs together by frictional force. When the return path 1a in the rear straight portion A passes through the rear first and second rolling-up frames 7 and 8, the flat transporting belt 1 is rolled up gradually with the holding belt 6 by the rolling-up rollers 10 into a tubular shape so that it may be held in the holding belt 6.

Figure 4:
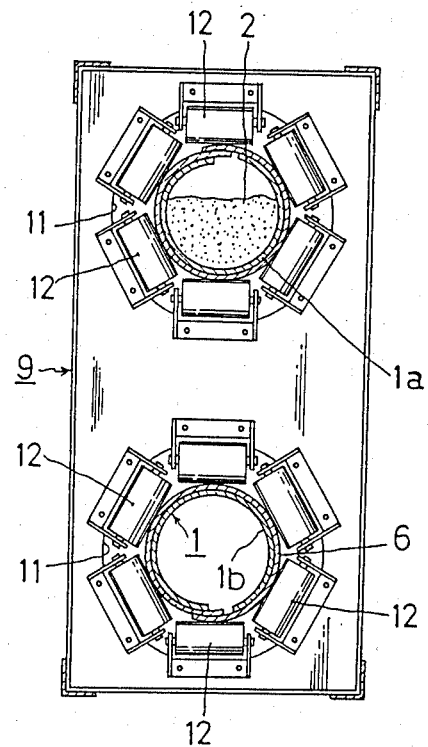
FIG. 4 is an enlarged sectional view taken along line X—X in FIG. 1.

As shown in FIG. 4, while the transporting and holding belts 1 and 6 pass through the upper opening 11 in the shape-maintaining frame 9, they turn to the right. Passing through the second and first rolling-up frames 8 and 7 provided at the front part of the curved portion B, the belt 1 opens to go straight on the front straight portion A.

After traveling around the front roller 4, as the holding belt 6 passes through the front rolling-up frames 7 and 8 in the curved portion B, it is rolled up into a tubular shape which holds the ruturn path 1b of the flat belt 1. Passing through the rear rolling-up frames 8 and 7 in the curved portion B, the return path 1b opens to go straight on the rear straight portion A and the holding belt 6 travels around the rear roller 6 to circulate.

Because the return belt 1b is empty, the opened return path 1b and holding belts 6 may be turned by tilting in the width direction.

Figure 5:
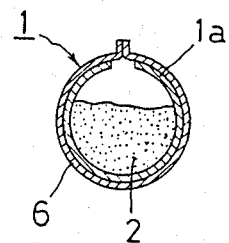
FIG. 5 is a vertical sectional view of another embodiment of a belt conveyor according to the present invention.

As shown in FIG. 5, the holding belt 6 may be rolled up by contacting the inner surfaces with each other along its entire length instead of overlapping the inner surface of one side end on the outer surface of the other side end.

Figure 6:
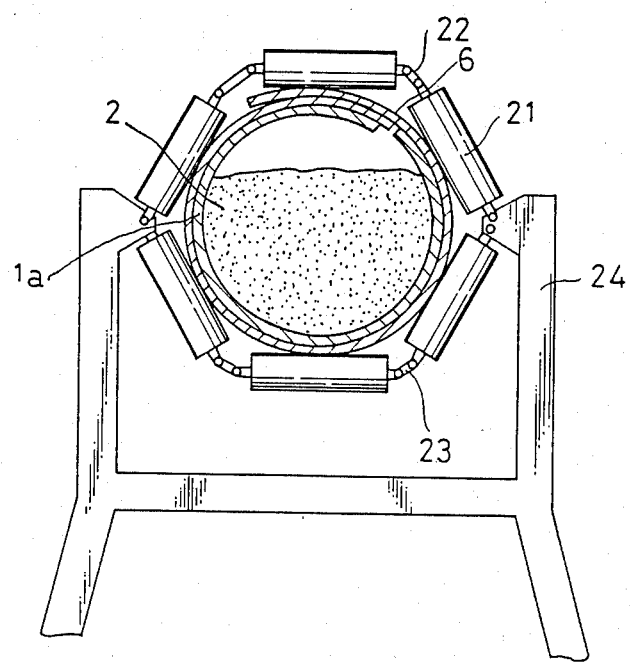
FIG. 6 is a vertical sectional view of further embodiment of a belt conveyor according to the present invention.

FIG. 6 illustrates further embodiment of a belt conveyor according to the present invention where a holding belt 6 is supported by three upper support rollers 21 and three lower support rollers 21. The upper rollers 21 are connected by an upper link 22, while the lower rollers 21 are connected by a lower link 23. The upper and lower links 22 and 23 are supported by a support 24 at the side ends. FIG. 6 shows only the upper part of the belt conveyor, but the lower part comprises similar structure.

In the above embodiments, the holding belt 6 is traveled by frictional force with the transporting belt 1, but may be traveled under power.

Further, in the above embodiments, the present invention applys to a belt conveyor where the conveying direction turns to right and left, but may apply to a belt conveyor where a transporting belt travels up and down with a steep slope, or a belt conveyor where conveyed material is liable to be exposed to the weather or other hindrance on the straight way. In case that the present invention is used with the steep slope, fluidizable material can be somewhat compacted within the tubular forward belt and can be therefore conveyed smoothly without slipping down. It is therefore advantageous that material can be conveyed at a steep slope where it could not be conveyed by a conventional flat belt.

Because the present invention applies to only parts exposed to the weather, the other parts of the belt may be kept flat, which leads to reduced cost compared with an entirely tubular belt conveyor.

In the above embodiment of a belt conveyor, the holding belt 6 holds both of the forward and return paths 1a and 1b of the transporting belt 1 like a tube, but may hold one of the foward and return paths, while the other is kept flat to contact or space the holding belt 6.

According to the present invention, the part of the flat transporting belt is held in a tubular form of the holding belt. The part held by the holding belt and conveyed material therein can be therefore protected from the weather etc. and the transporting belt can be curved horizontally or vertically depending on the purpose of use. Thus, it is advantageous for the invention to apply to a belt conveyor where conveyed material is transferred by a number of flat belt conveyors.

Also, according to the present invention, material can be conveyed at a steep slope where the conventional flat belt could not transport it.

It should be noted that the foregoing relates only to preferred embodiments of the present invention, and that modification or variation may be made by person skilled in the art without departing from the spirit of the invention.

The scope of the invention is therefore to be determined solely by the appended claims:

What is claimed is:

1. A belt conveyor which comprises:
   an endless transporting belt;
   an endless holding belt wider than said transporting belt, the holding belt being rolled up into a tubular shape which contains the part of the transporting belt;
   a plurality of shape-maintaining frames provided with spaces along the length of both the belts; and
   a plurality of shape-maintaining rollers arranged within said shape-maintaining frame like a circle to keep the holding belt in the tubular shape which holds both of the forward and return paths of the transporting belt.

2. A belt conveyor as defined in claim 1 wherein the belt conveyor comprises a front and a rear roller around which the flattened holding belt is wound to circulate between the front and rear rollers.

3. A belt conveyor as defined in claim 1 wherein the belt conveyor comprises one or more rolling-up frames disposed in the vicinity of the end of the holding belt, and a plurality of rolling-up rollers arranged within the rolling-up frame like a circle to roll up the holding belt into a tubular shape.

4. A belt conveyor as defined in any of claims 1 to 3 wherein the holding belt is rolled up by overlapping the inner surface of one side end on the outer surface of the other side end along its entire length.

5. A belt conveyor as defined in any of claims 1 to 3 wherein the holding belt is rolled up by contacting the inner surfaces of the side ends with each other to form a projection along its entire length.

6. A belt conveyor as defined in any of claims 1 to 3 wherein the holding belt is supported by a plurality of support rollers which are connected by an upper and a lower link separately on a support.

* * * * *